United States Patent
Nakamura et al.

(10) Patent No.: US 7,241,985 B2
(45) Date of Patent: Jul. 10, 2007

(54) SHEET CONVEYING APPARATUS HAVING SUPPORTED OPENABLY UPSTREAM AND DOWNSTREAM PORTIONS, IMAGE READING APPARATUS AND IMAGE READING AND FORMING APPARATUS

(75) Inventors: Fumihiko Nakamura, Tokyo (JP); Takafumi Katayama, Kashiwa (JP); Tatsuyuki Yamamoto, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/358,208

(22) Filed: Feb. 22, 2006

(65) Prior Publication Data
US 2006/0192080 A1    Aug. 31, 2006

(30) Foreign Application Priority Data
Feb. 28, 2005   (JP)   ............................. 2005-055176

(51) Int. Cl.
*H01L 27/00* (2006.01)
(52) U.S. Cl. ..................... 250/208.1; 250/239
(58) Field of Classification Search ............ 250/208.1, 250/239, 221, 223 R, 548; 399/122, 123, 399/124, 322; 358/437, 496, 498
See application file for complete search history.

(56) References Cited

U.S. PATENT DOCUMENTS
4,766,464 A * 8/1988 Watanabe et al. ............. 399/15

FOREIGN PATENT DOCUMENTS
JP   10-17176    1/1998
JP   10-126569   5/1998

* cited by examiner

*Primary Examiner*—Que T Le
(74) *Attorney, Agent, or Firm*—Fitzpatrick, Cella, Harper & Scinto

(57) ABSTRACT

A sheet conveying apparatus has a feeding port from which a sheet is fed, a discharging port from which the sheet is discharged, a U-shaped conveying path for guiding the sheet fed from the feeding port, and discharging it from the discharging port, and a pair of sheet conveying rotary members for conveying the sheet guided by the conveying path. The conveying path is formed by an inner side wall and an outer side wall opposed to the inner side wall, the outer side wall is divided into an upstream portion and a downstream portion with respect to a sheet conveying direction, and each of the upstream portion and downstream portion of the outer side wall is supported openably and closably relative to the inner side wall.

11 Claims, 6 Drawing Sheets

(PRIOR ART)

SHEET CONVEYING APPARATUS HAVING SUPPORTED OPENABLY UPSTREAM AND DOWNSTREAM PORTIONS, IMAGE READING APPARATUS AND IMAGE READING AND FORMING APPARATUS

BACKGROUND OF THE INVENTION

1. Field of the Invention

The invention relates to a sheet conveying apparatus for conveying a sheet, and an image reading apparatus for reading an original conveyed by this sheet conveying apparatus. The invention also relates to an image reading and forming apparatus provided with the image reading apparatus and an image forming apparatus for forming an image on a sheet on the basis of the image reading information of the image reading apparatus.

2. Description of Related Art

There have heretofore been sheet conveying apparatuses for conveying a sheet (see Japanese Patent Application Laid-open No. H10-126569 and Japanese Patent Application Laid-open No. H10-17176).

FIG. 5A of the accompanying drawings is a schematic front cross-sectional view of a sheet conveying apparatus described in Japanese Patent Application Laid-open No. H10-126569. This sheet conveying apparatus 101 is provided with a U-shaped conveying path 102 and is incorporated in an image reading apparatus for reading an original and therefore, a reading portion 103 for reading an original is provided in the conveying path 102. In the sheet conveying apparatus 101, the lower outer guide 102a of the conveying path 102 is formed in a scanner unit 104 fixedly disposed on the lowermost surface thereof. An original conveying unit 105 in the upper portion of the apparatus is pivotally movably provided on the scanner unit 104 by a bearing portion 106. When a user upwardly pivotally moves the original conveying unit 105 in an upper portion including an upper outer guide 102b (FIG. 5B of the accompanying drawings) when the original clogs, the lower outer guide 102a is opened so that the clogged original (jammed original) can be removed.

FIGS. 6A, 6B and 6C of the accompanying drawings are schematic front cross-sectional views of a sheet conveying apparatus described in Japanese Patent Application Laid-open No. H10-17176. This sheet conveying apparatus 201 is also provided with a U-shaped conveying path 202. This sheet conveying apparatus 201 is also incorporated in an image reading apparatus for reading an original. In the sheet conveying apparatus 201, the lower outer guide 202a of the conveying path 202 is formed on a scanner unit 204 fixed disposed on the lowermost surface of the apparatus. An original conveying unit 205 in an upper portion is pivotally movably provided on the scanner unit 204 by a bearing portion 206. The original conveying unit 205 is formed by a roller housing 207 and a cover 208.

The sheet conveying apparatus 201 shown in FIG. 6A is designed such that when a user upwardly pivotally moves the original conveying unit 205 (FIG. 6B) when an original clogs, the lower outer guide 202a is liberated and the original (jamming original) clogging on the lower outer guide 202a can be removed. Also, design is made such that when the cover 208 is opened, the original (jamming original) clogging on an upper outer guide 202b (see FIG. 6A) can be removed (FIG. 6C).

However, in the conventional sheet conveying apparatuses 101 and 201, it is often the case that the original conveying units 105 and 205 raised by the user are usually provided with parts such as a drive system such as a motor, a conveying roller, a gear and a clutch which are high in operation accuracy and heavy in weight. Moreover, the upper outer guides 102b and 202b are also raised together with the original conveying units and therefore, the original conveying units 105 and 205 have been heavier.

Thus, the user had to raise the heavy original conveying unit 105, 205 by one hand and remove the jamming original by the other hand.

Accordingly, the conventional sheet conveying apparatuses have suffered from the problem that it is difficult to do the work of removing the jamming original. Also, much time has been required for the work of removing the jamming original.

SUMMARY OF THE INVENTION

It is the object of the present invention to provide a sheet conveying apparatus, which facilitates the removal of a jamming sheet.

In order to achieve the above object, the sheet conveying apparatus of the present invention has:

a feeding port from which a sheet is fed;

a discharging port from which the sheet is discharged;

a U-shaped conveying path, which guides the sheet fed from the feeding port, and discharges the sheet from the discharging port; and a pair of sheet conveying rotary members, which conveys the sheet guided by the conveying path, wherein the conveying path is formed by an inner side wall and an outer side wall opposed to the inner side wall, and the outer side wall is divided into an upstream portion and a downstream portion with respect to a sheet conveying direction, and each of the upstream portion and downstream portion of the outer side wall is supported openably and closably relative to the inner side wall.

BRIEF DESCRIPTION OF THE DRAWINGS

FIGS. 5A and 5B show a conventional sheet conveying apparatus. FIG. 5A is a schematic front cross-sectional view thereof, and FIG. 5B shows a state in which an original conveying unit has been upwardly pivotally moved.

DETAILED DESCRIPTION OF THE PREFERRED EMBODIMENTS

A sheet conveying apparatus according to an embodiment of the present invention, an image reading apparatus provided with this sheet conveying apparatus, and a facsimile apparatus as an image reading and forming apparatus provided with this image reading apparatus and an image forming apparatus will hereinafter be described with reference to the drawings.

Description will hereinafter be made of (1) the facsimile apparatus, (2) the image reading apparatus and the sheet conveying apparatus, and (3) the image forming apparatus in the named order.

(1) Facsimile Apparatus

Figure 3:
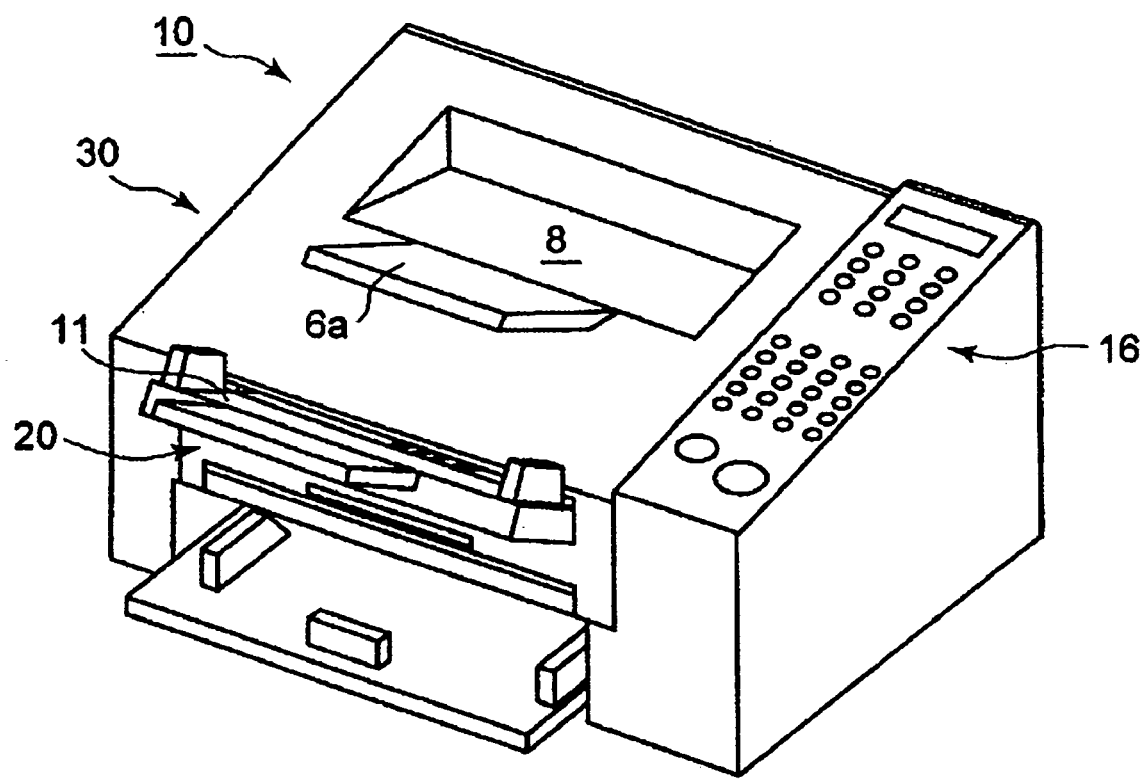
FIG. 3 is a pictorial perspective view of a facsimile apparatus.
Figure 4:
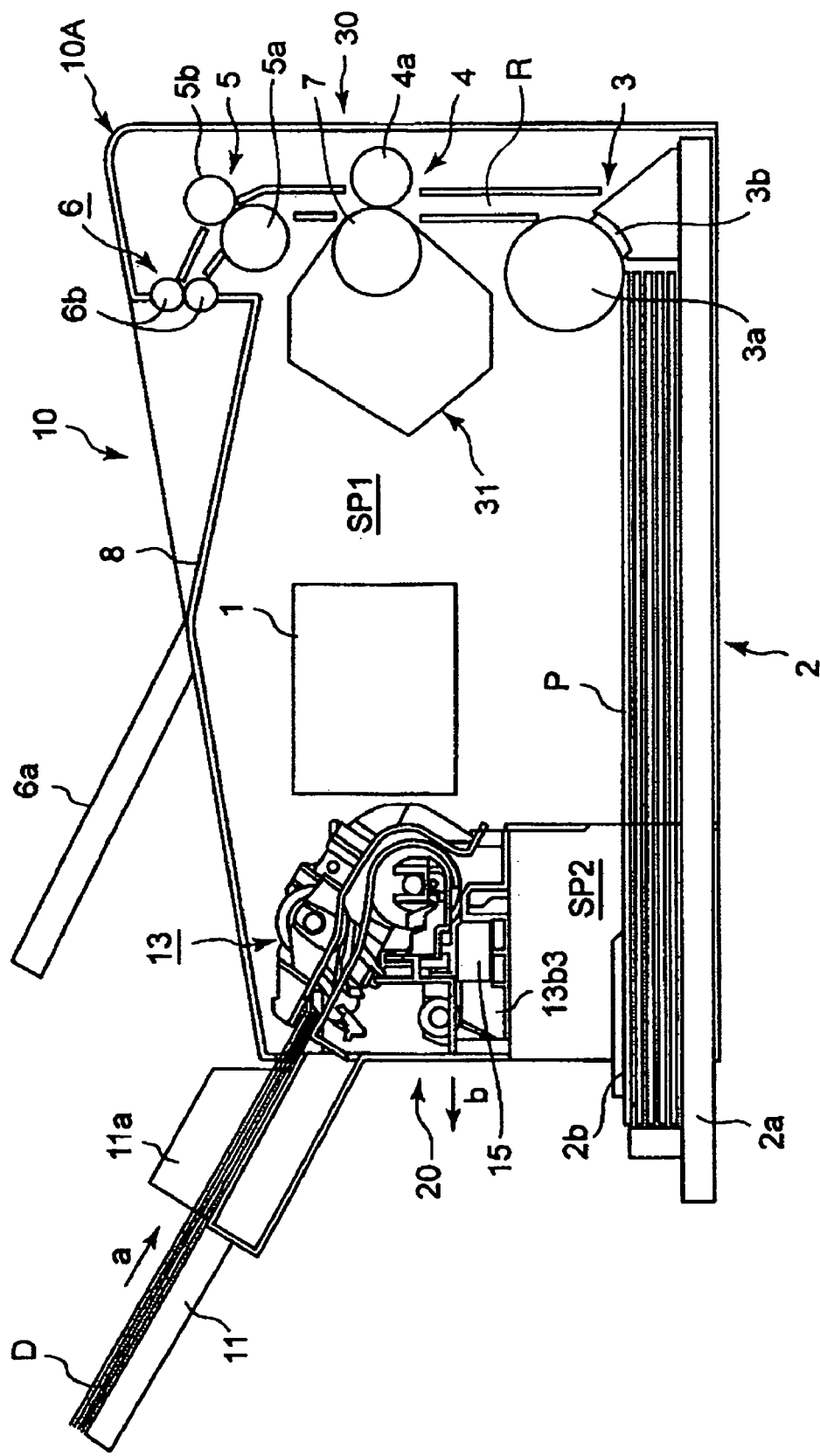
FIG. 4 is a schematic cross-sectional view of the facsimile apparatus of FIG. 3 taken along the conveying direction of an original and a recording sheet.
Figure 5A:
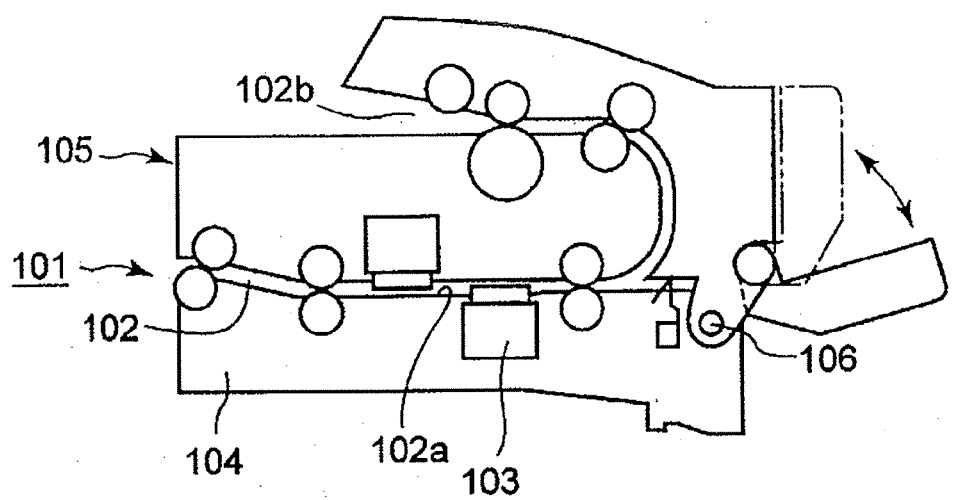
Figure 5A:
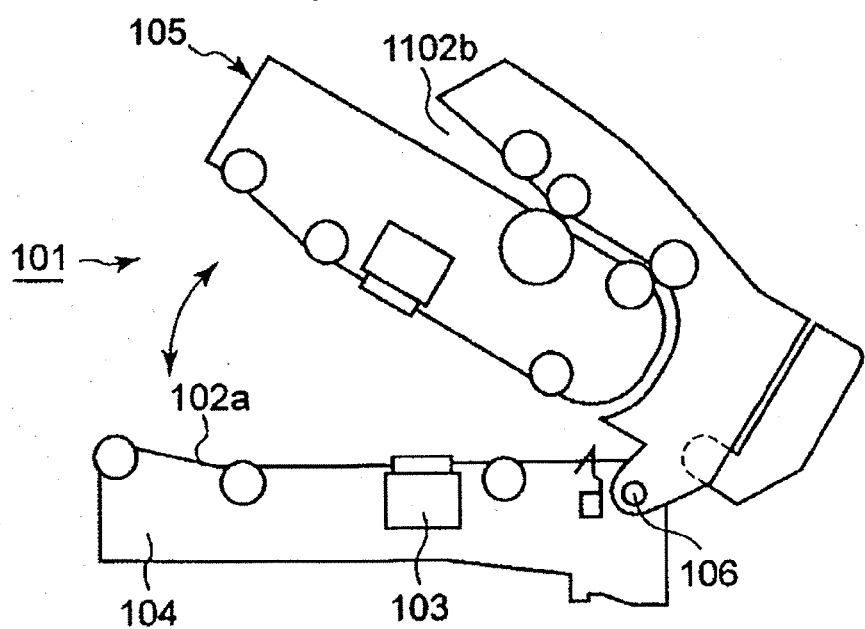
Figure 6A:
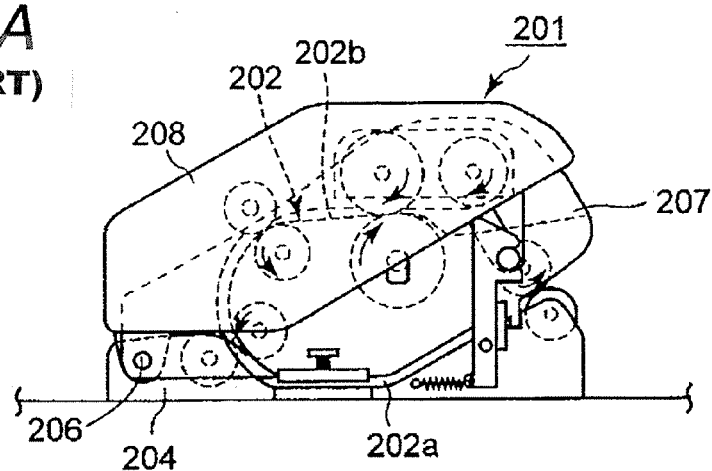
FIG. 6A is a schematic front cross-sectional view of another conventional sheet conveying apparatus.
Figure 6B:
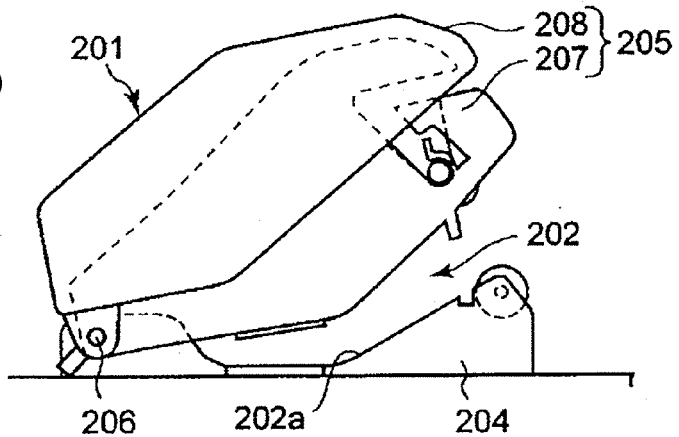
FIG. 6B shows a state in which in the aforementioned another sheet conveying apparatus, an original conveying unit has been upwardly pivotally moved.
Figure 6C:
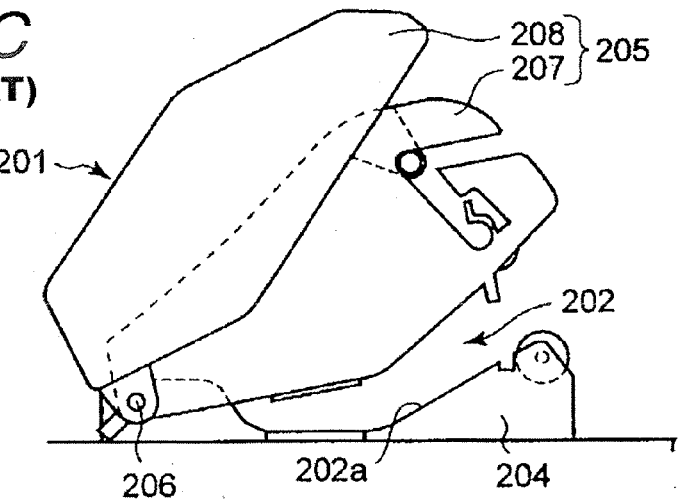
FIG. 6C shows a state in which a cover has been opened from the state of FIG. 6B.

FIG. 3 is a pictorial perspective view of the facsimile apparatus 10 as the image reading and forming apparatus. FIG. 4 is a schematic cross-sectional view of the facsimile apparatus 10 taken along the conveying direction of an original D and a recording sheet P as sheets.

The facsimile apparatus 10 has an image reading apparatus 20 on this side of a facsimile apparatus main body 10A, and has an image forming apparatus 30 on the back side thereof. The facsimile apparatus 10 is designed such that when operation instructing information is inputted from the input key of an operating portion 16 disposed on the upper side portion of the facsimile apparatus main body 10A or from a touch panel by a user, it is operated on the basis of the information. The operating portion 16 is also designed to display the operating situation of the facsimile apparatus 10.

The facsimile apparatus 10, when a copy mode is selected by the user, is designed to form on the recording sheet P the image reading information of the original D read by the image reading apparatus 20 by its own image forming apparatus 30. Also, the facsimile apparatus 10, when a facsimile mode is selected by the user, is designed to transmit to other facsimile apparatus the image reading information of the original D read by the image reading apparatus 20. Further, the facsimile apparatus 10 is also designed to be capable of automatically form on the recording sheet P the image reading information transmitted thereto from other facsimile apparatus, by the image forming apparatus 30.

The facsimile apparatus 10 is such that the image reading apparatus 20 and the image forming apparatus 30 are arranged in parallel to an installing surface, and is low in height.

Also, the facsimile apparatus 10 is designed such that the process cartridge 31 of the image forming apparatus 30 can be taken out of the main body 10A. That is, the image forming apparatus 30 which will be described later applies a laser beam based on the image reading information from an optical system 1 to the photosensitive drum 7 of the process cartridge 31 to thereby form an electrostatic latent image thereon. The electrostatic latent image is developed into a toner image with a developer (toner) by a developing device (not shown) in the process cartridge 31. Design is made such that when the user upwardly opens an openable and closable member 8, the user can upwardly take out the process cartridge 31, and perform the supply of the toner, maintenance, etc.

The facsimile apparatus 10 is designed such that the optical system 1 is disposed between the image reading apparatus 20 and the process cartridge 31, and a mounting and detaching space SP1 for the process cartridge 31 is formed between the optical system 1 and the process cartridge 31 and therefore, the process cartridge 31 can be simply and quickly mounted and detached.

(2) Image Reading Apparatus and Sheet Conveying Apparatus

The image reading apparatus 20 has the sheet conveying apparatus 13 incorporated therein and therefore, the image reading apparatus and the sheet conveying apparatus will hereinafter be described at a time. The sheet conveying apparatus is not always be provided only in the image reading apparatus, but may be provided, for example, in an image forming apparatus for conveying a sheet, or a treating apparatus for binding sheets or effecting treatment on sheets. Therefore, the sheet conveying apparatus is not provided only in the image reading apparatus.

Figure 1:
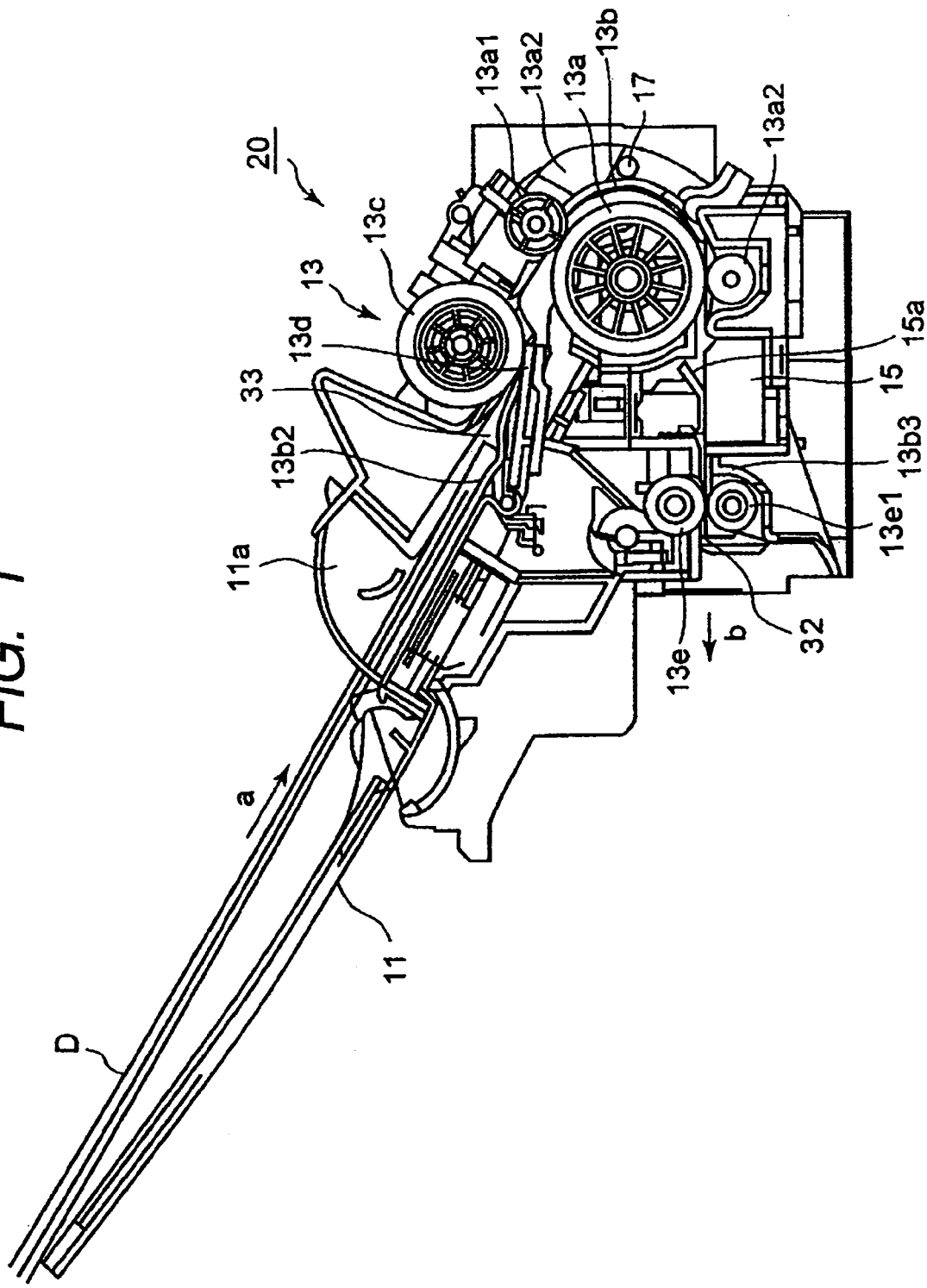
FIG. 1 is a front cross-sectional view of an image reading apparatus.
Figure 2:
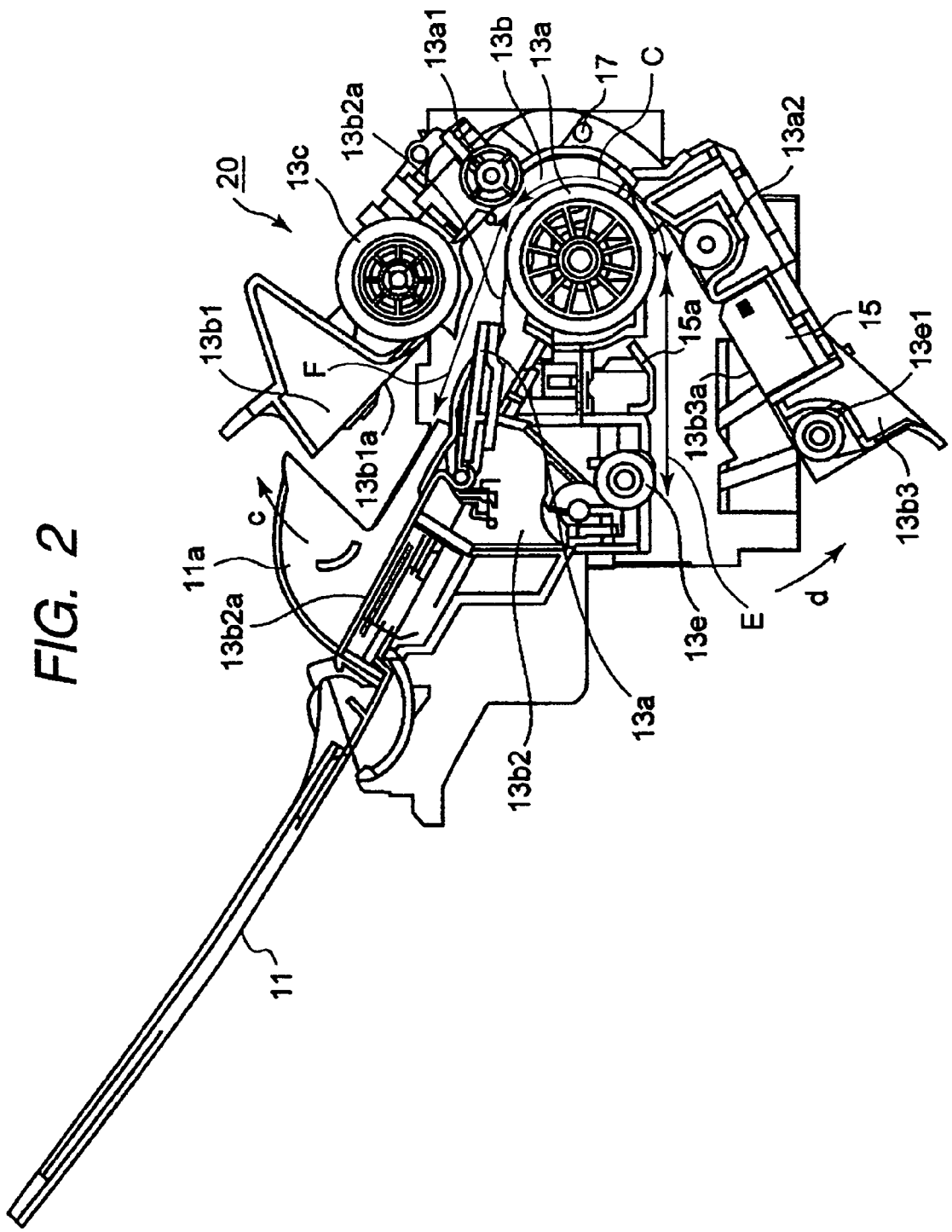
FIG. 2 shows a state in which in the image reading apparatus of FIG. 1, an upper outer guide unit and a lower outer guide unit are opened relative to an inner guide unit, and a U-shaped path is opened.

The operation of the image reading apparatus 20 will first be described schematically. In FIGS. 1 and 2, the image reading apparatus 20 reads an image described on an original. The image reading apparatus 20 conveys a plurality of originals D placed on an original tray 11 with their image surfaces facing upwardly one by one from the uppermost original in the direction indicated by the arrow "a" by the sheet conveying apparatus 13 which will be described later, reverses the original by the sheet conveying apparatus 13, and reads the image thereof by a contact image sensor 15 as an image reading sensor stopped at a reading position. The image reading information is sent to the optical system 1 of the image forming apparatus 30. Thereafter, the image reading apparatus 20 conveys the original of which the image has been read in the direction indicated by the arrow "b" by the sheet conveying apparatus 13, and discharges the original out of the apparatus.

Description will now be made of the construction and operation of the image reading apparatus 20.

A plurality of originals D are stacked on the original tray 11. The original tray 11 is provided with a slider 11a slidable in a direction orthogonal to the conveying direction of the original (the width direction of the original). The slider 11a properly arranges the opposite ends of the originals D placed on the original tray 11.

The sheet conveying apparatus 13 has a U-shaped path 13b as a U-shaped conveying path. The U-shaped path 13b is a conveying path for guiding the original fed from a feeding port 33 and discharging the original from a discharging port 32. In this U-shaped path 13b, there are provided an original presence or absence sensor (not shown) for detecting the presence or absence of the original D, a separating roller 13c and a separating pad 13d, a reverse main roller 13a and opposed runners 13a1, 13a2 for conveying the original D, a sheet discharging roller 13e and a driven runner 13e1, an original edge sensor (not shown) for detecting the leading edge portion and trailing edge portion of the original D, etc. The reverse main roller 13a as a driving rotary member and the driven runners 13a1 and 13a2 as driven rotary members, the sheet discharging roller 13e as a driving rotary member and the driven runner 13e1 as a driven rotary member together constitute the pair of rotary members of sheet conveying means.

The U-shaped path 13b is constituted a feeding portion F, a curved portion C downstream of the feeding portion F, and a sheet discharging portion E downstream of the curved portion C. The feeding portion F is a portion for guiding the original from the feeding port 33 to the curved portion C. In the feeding portion F, there are provided the separating roller 13c and the separating pad 13d disposed near the feeding port 33. The curved portion C is a portion in which the U-shaped path 13b is curved so as to assume a U-shape. In the curved portion C, there are provided the reverse main roller 13*a* and the opposed runners 13*a*1 and 13*a*2. The sheet discharging portion E is a portion for guiding the original from the curved portion C to the discharging port 32. In the sheet discharging portion E, there are provided the contact image sensor 15, the sheet discharging roller 13*e* and the driven runner 13*e*1.

The contact image sensor 15 disposed in the U-shaped path 13*b* is adapted to apply light from an LED array as a light source to the image-formed surface of the original D, and adapted to image light reflected by the image-formed surface on a sensor element by SELFOC lens (trademark) to thereby read the image.

The original tray 11 is designed such that when the user placed the original D thereon, the original D is set with its read image surface facing upwardly from this side (the left side as viewed in FIGS. 1 and 2) of the apparatus. The originals stacked on the original tray 11 are adapted to be stopped by an original stopper (not shown) so as not to unnecessarily come into between the separating roller 13*c* and the separating pad 13*d*. The original presence or absence sensor (not shown) is adapted to detect whether the originals D are stacked on the original tray 11.

When operating information is inputted to an operating portion 16 (see FIG. 3) by the user, a driving portion (not shown) starts its operation. Thereupon, the separating roller 13*c* starts its rotation. The separating roller 13*c* cooperates with the separating pad 13*d* to separate the originals D one by one, and feed only the uppermost original D into between an upper outer guide unit 13*b*1 and an inner guide unit 13*b*2 forming the U-shaped path 13*b*. That is, the original is fed into between the inner side wall 13*b*2*a* of the U-shaped path 13*b* and the upstream portion 13*b*1*a* of the outer side wall thereof. Then, the main roller 13*a* and the driven runners 13*a*1 and 13*a*2 convey the original to the reading position of the contact image sensor 15 by the guidance of the U-shaped path 13*b*.

The contact image sensor 15 starts to read the image of the original when the original has been conveyed by a predetermined amount from the position at which the original edge sensor (not shown) has detected the leading edge portion of the original D. At that time, a reading white background plate 15*a* urges the original against the contact image sensor 15 to thereby enhance the reading accuracy of the image sensor 15. Also, the inner side wall 13*b*2*a* and the upstream portion 13*b*1*a* of the outer side wall of the U-shaped path 13*b* guide the original. The main roller 13*a* is not located over the entire width of the reading area of the original, but is on the position of a width of about 20 mm (a reference numerical value, which does not restrict the present invention thereto) of the central portion of the reading area in the width direction thereof.

Thereafter, the contact image sensor 15 terminates the reading of the image when the original has been conveyed by a predetermined amount after the original edge sensor (not shown) has detected the trailing edge portion of the original D. Then, the sheet discharging roller 13*e* and the driven runner 13*e*1 discharge the original D in the direction indicated by the arrow "b" (see FIG. 4). In this manner, the image reading apparatus 20 repeats the above-described reading operation until the original presence or absence sensor (not shown) detects the absence of the original.

Description will now be made of a jamming original removing operation and a cleaning operation for the image sensor 15 in the sheet conveying apparatus 13.

FIG. 2 shows a state in which the U-shaped path 13*b* has been opened. The inner guide unit 13*b*2 is fixed to the facsimile apparatus main body 10A. The upper outer guide unit 13*b*1 and the lower outer guide unit 13*b*3 are supported on a rotation center shaft 17 as a rotation center provided on the inner guide unit 13*b*2 so as to be rotatable in the direction indicated by the arrow "c" and the direction indicated by the arrow "d", respectively, to open and close the U-shaped path 13*b*. Therefore, the rotation center of the upper outer guide unit 13*b*1 is provided on the downstream side with respect to the original conveying direction. Also, the rotation center of the lower outer guide unit 13*b*3 is provided on the upstream side with respect to the original conveying direction.

Also, the inner guide unit 13*b*2 is provided with the reading white background plate 15*a*, the reverse main roller 13*a* and the sheet discharging roller 13*e*, and a motor (not shown) for driving these rollers, etc. The upper outer guide unit 13*b*1 is provided with the separating roller 13*c*, the driven runner 13*a*1 contacting with the reverse main roller 13*a*, etc. The lower outer guide unit 13*b*3 is provided with the driven runner 13*a*2 contacting with the reverse main roller 13*a*, the contact image sensor 15, the driven runner 13*e*1 contacting with the sheet discharging roller 13*e*, etc.

The U-shaped path 13*b* is formed by surfaces opposed to the inner guide unit 13*b*2, the upper outer guide unit 13*b*1 opposed on the upstream side of the inner guide unit 13*b*2, and the lower outer guide unit 13*b*3 opposed on the inner guide unit 13*b*2. That is, the outer surface of the inner guide unit 13*b*2 forms the inner side wall 13*b*2*a* of the U-shaped path 13*b*. The respective surfaces of the upper outer guide unit 13*b*1 and the lower outer guide unit 13*b*3 opposed to the inner guide unit 13*b*2 form the upstream portion 13*b*1*a* of the outer side wall and the downstream portion 13*b*3*a* of the outer side wall, of the U-shaped path 13*b*.

When the user upwardly rotates the upper outer guide unit 13*b*1 and downwardly rotates the lower outer guide unit 13*b*3 when an original clogs in the U-shaped path 13*b*, the upstream portion 13*b*1*a* of the outer side wall and the downstream portion 13*b*3*a* of the outer side wall separate from the inner side wall 13*b*2*a* constituting the U-shaped path 13*b*. Consequently, by the upper outer guide unit 13*b*1 and the lower outer guide unit 13*b*3 being rotated upwardly and downwardly, respectively, the U-shaped path 13*b* is opened. When as shown in FIG. 2, the upper outer guide unit 13*b*1 is upwardly rotated, the feeding portion F and a portion of the curved portion C in the U-shaped path 13*a* are opened and also, the feeding port 33 is opened. When the lower outer guide unit 13*b*3 is downwardly rotated, a portion of the curved portion C and the sheet discharging portion E are opened and also, the discharging port 32 is opened.

Also, by the upper outer guide unit 13*b*1 being upwardly rotated, the separating roller 13*c* is separated from the separating pad 13*d* and also, the driven runner 13*a*1 is separated from the reverse main roller 13*a*. By the lower outer guide unit 13*b*3 being downwardly rotated, the driven runner 13*a*2 is separated from the reverse main roller 13*a* and also, the driven runner 13*e*1 is separated from the sheet discharging roller 13*e*. The sheet discharging roller 13*e* and the driven runner 13*e*1 together constitute a pair of sheet discharging rollers. By the lower outer guide unit 13*b*3 being rotated, one of the pair of discharging rollers is spaced apart from the other roller.

Since the upper outer guide unit 13*b*1 supports the separating roller 13*c*, the separating roller 13*c* is rotated integrally with the upstream portion 13*b*1*a* of the outer side wall. Also, since the lower outer guide unit 13*b*3 supports the contact image sensor 15, the contact image sensor 15 is rotated integrally with the downstream portion 13*b*3*a* of the outer side wall.

As the result, it is possible to easily and quickly remove a jamming original clogging between the inner side wall 13b2a of the U-shaped path 13b and the upstream portion 13b1a of the outer side wall or the downstream portion 13b3a of the outer side wall, a jamming original clogging between the separating pad 13d and the separating roller 13c, a jamming original clogging between the reverse main roller 13a and the sheet discharging roller 13e and the driven runners 13a1, 13a2, 13e1, etc.

Also, the fixed inner guide unit 13b2 is provided with the reading white background plate 15a, the driven reverse main roller 13a and the driven sheet discharging roller 13e, a motor for driving these rollers, etc. Accordingly, the upper outer guide unit 13b1 and the lower outer guide unit 13b3 can be made light in weight. Therefore, the upper outer guide unit 13b1 and the lower outer guide unit 13b3 can be easily rotated by one hand to thereby effect jam treatment easily and quickly.

Also, the light weight enables the upper outer guide unit 13b1 and the lower outer guide unit 13b3 to be opened and closed easily and quickly, and can make the shock sound during the opening and closing thereof small. Further the shock during the opening and closing also becomes small the therefore, a reduction in the original conveying accuracy can also be prevented. Also, a load applied to the rotation center shaft 17 becomes smaller than in the conventional art, and a mechanism regarding the rotation center shaft 17 can be simplified, and the mechanism can be downsized and lower in cost.

Further, since the contact image sensor 15 is provided in the rotating lower outer guide unit 13b3, the lower outer guide unit 13b3 is opened to a predetermined position from gravity and therefore, it becomes unnecessary for the user to support the lower outer guide unit 13b3 by one hand and carry out the jam treating work, and it becomes possible to eliminate the jam treating work easily.

The rotation centers of the upper outer guide unit 13b1 and the lower outer guide unit 13b3 are provided in the curved portion C of the U-shaped path 13b. The feeding port 33 and the discharging port 32 are located on the front side of the sheet conveying apparatus 13, on the inner part side of the sheet conveying apparatus 13 with respect to the feeding port 33 and the discharging port 32 (see FIG. 3). When the user rotates the upper outer guide unit 13b1 and the lower outer guide unit 13b3, the user operates from the front side of the apparatus and therefore, the operability of the apparatus is good.

(3) Image Forming Apparatus

The image forming apparatus shown in FIG. 4 is a copying machine, but image forming apparatuses include a facsimile, a printer, etc. and therefore, the copying machine is not restrictive.

The image forming apparatus 30 is provided with an optical system 1, a recording sheet feeding portion 2, a transferring portion 4, a fixing device 5, a recording sheet discharging portion 6 and a process cartridge 31. The image forming apparatus 30 is adapted to form an image on a recording sheet P on the basis of image reading information sent from an image reading apparatus 20 or an external facsimile apparatus to the optical system 1.

The construction and operation of the image forming apparatus will hereinafter be described at a time.

The optical system 1 is adapted to apply light to a photosensitive drum 7 on the basis of the image reading information from the image reading apparatus 20 or the external facsimile apparatus. In the optical system 1, there are contained a laser diode, a polygon mirror, a scanner motor, an imaging lens, etc.

The optical system 1 is such that when the image reading information is sent thereto from the image reading apparatus 20, the laser diode emits light in accordance with an image signal, and applies the light as image light to the polygon mirror. This polygon mirror reflect the image light while being rotated at a high speed by the scanner motor, and applies the light to the rotating photosensitive drum 7 through an imaging lens. Thus, the surface of the photosensitive drum 7 is selectively exposed to the light, whereby an electrostatic latent image conforming to the image reading information is formed thereon.

On the bottom of the facsimile apparatus main body 10A shown in FIG. 4, there is provided the recording sheet feeding portion 2 which makes a portion of the recording sheet P protrude from the front surface (the left side as viewed in FIG. 3) of the apparatus and supports it. The recording sheet feeding portion 2 is provided with a recording sheet stacking portion 2a provided in the interior of the facsimile apparatus main body 10A. The recording sheet stacking portion 2a is provided with a multi-slider 2b provided for sliding in a direction perpendicular to the conveying direction of the recording sheet P (the width direction of the recording sheet P). The multi-slider 2b is designed to be capable of properly arranging the opposite side edges of a recording sheet of a fixed size such as A4 size or a letter size, as well as a recording sheet of a non-fixed size such as a postcard or an envelope.

The image reading apparatus 20 is disposed above the recording sheet stacking portion 2a. Between the lower outer guide unit 13b3 of the image reading apparatus 20 and the recording sheet stacking portion 2a as sheet stacking means, there is formed a space SP2 which permits the lower outer guide unit 13b3 to be downwardly rotated. As the result, the lower outer guide unit 13b3 can be downwardly rotated to thereby open the downstream portion 13b3a of the outer side wall of the U-shaped path 13 so that the removal of a jamming original and the cleaning of the image sensor 15 can be facilitated.

A recording sheet conveying portion 3 for conveying the recording sheet P is disposed in the lower inner portion of the image forming apparatus 30. The recording sheet conveying portion 3 separates the recording sheets P stacked on the recording sheet feeding portion 2 one by one by a pickup roller 3a and a separating pad 3b urged against the pickup roller 3a by an urging spring (not shown), and conveys the recording sheet to the transferring portion 4.

The recording sheet P to which the image has been transferred by the transferring portion 4 is conveyed to the fixing device 5, where the image thereon is fixed, whereafter the recording sheet P is discharged by the recording sheet discharging portion 6.

The transferring portion 4 is adapted to transfer a toner image formed on the photosensitive drum 7 by an image forming portion to the recording sheet P. The transferring portion 4 is provided with a transfer roller 4a to which a voltage of a polarity opposite to that of the toner image formed on the photosensitive drum 7 has been applied. The transferring portion 4 urges the recording sheet P against the photosensitive drum 7 of the process cartridge 31 by the transfer roller 4a, and transfers the toner image on the photosensitive drum 7 to the recording sheet P. The recording sheet P is conveyed into the transferring portion 4 in accordance with the position of the toner image on the photosensitive drum 7 by the recording sheet conveying portion 3.

The fixing device 5 is provided with a rotatively driven driving roller 5a and a fixing member 5b. The driving roller 5a and the fixing member 5b which is a heat generating portion heat and pressurize the recording sheet P while being rotated with the recording sheet P nipped therebetween and conveying the recording sheet P, to thereby fix the toner image on the recording sheet P. The fixing device 5 is disposed above the process cartridge 31. Therefore, the heat of the fixing device 5 does not stay in the facsimile apparatus main body 10A, but is exhausted from the recording sheet discharging portion 6 to the outside. The transferring portion 4 and the fixing device 5 together form the image forming portion.

As shown in FIG. 4, a recording sheet path R for guiding the recording sheet from the recording sheet conveying portion 3 to the fixing device 5 via the transferring portion 4 is provided on the inner part side of the apparatus so as to generally vertically upwardly guide the recording sheet.

The recording sheet discharging portion 6 discharges the recording sheet P onto a recording sheet tray 6a in a face-down state in which the recorded image surface of the recording sheet P on which the toner image has been fixed faces downwardly by a pair of sheet discharging rollers 6b. Recording sheets with their image-formed surfaces facing down are stacked on the recording sheet tray 6a in the order of pages.

The above-described image forming apparatus 30 is provided with a driving portion (not shown) for driving the recording sheet conveying portion 3, the transferring portion 4, the fixing device 5, the recording sheet discharging portion 6, the process cartridge 31, etc. This driving portion is adapted to transmit a driving force from a motor as a drive source to each rotary member by a gear train to thereby rotate each rotary member.

In the above-described sheet conveying apparatus, the outer side wall is divided into an upstream portion and a downstream portion with respect to a sheet conveying direction and is provided for movement toward and away from the inner side wall. Consequently, the upstream portion and the downstream portion can be opened in accordance with the position of a jamming sheet, and the removal of the jamming sheet can be performed easily and quickly.

Also, the image reading apparatus according to the above-described embodiment is provided with a sheet conveying apparatus which can effect the removal of a jamming original easily and quickly, and can therefore improve image reading efficiency.

Also, the image reading and forming apparatus according to the above-described embodiment is provided with an image reading apparatus provided with the sheet conveying apparatus which can perform the removal of a jamming original easily and quickly, and can therefore improve image forming efficiency.

This application claims priority from Japanese Patent Application No. 2005-055176 filed Feb. 28, 2005, which is hereby incorporated by reference herein.

What is claimed is:

1. A sheet conveying apparatus comprising:
a feeding port from which a sheet is fed;
a discharging port from which the sheet is discharged;
a U-shaped conveying path, which guides the sheet fed from said feeding port, and discharges the sheet from said discharging port; and
a pair of sheet conveying rotary members, which conveys the sheet guided by said conveying path,
wherein said conveying path is formed by an inner side wall and an outer side wall opposed to said inner side wall,
said outer side wall is divided into an upstream portion and a downstream portion with respect to a sheet conveying direction, and each of the upstream portion and downstream portion of said outer side wall is supported openably and closably relative to said inner side wall.

2. A sheet conveying apparatus according to claim 1, wherein a rotation center of said upstream portion is set on a downstream side with respect to the sheet conveying direction, and a rotation center of said downstream portion is set on an upstream side with respect to the sheet conveying direction.

3. A sheet conveying apparatus according to claim 1, wherein a driving rotary member of said pair of sheet conveying rotary members is provided on a side of said inner side wall, and a driven rotary member of said pair of sheet conveying rotary members is provided on a side of said outer side wall.

4. A sheet conveying apparatus according to claim 1, wherein said feeding port is opened by a rotation of said upstream portion, and said discharging port is opened by a rotation of said downstream portion.

5. A sheet conveying apparatus according to claim 1, further comprising:
a separating roller provided near said feeding port for separating sheets one by one,
said separating roller being rotated integrally with said upstream portion.

6. A sheet conveying apparatus according to claim 1, wherein a rotation center of said upstream portion and a rotation center of said downstream portion are provided in a curved portion of said conveying path curved so that said conveying path may be U-shaped.

7. An image reading apparatus comprising:
a sheet conveying apparatus, which conveys an original; and
an image reading sensor, which reads the original conveyed by said sheet conveying apparatus,
wherein said sheet conveying apparatus is a sheet conveying apparatus according to claim 1.

8. An image reading apparatus according to claim 7, wherein said conveying path has a curved portion, and said image reading sensor is provided downstream of the curved portion of said conveying path with respect to the conveying direction.

9. An image reading apparatus according to claim 8, wherein said image reading sensor is rotated integrally with said downstream portion.

10. An image reading and forming apparatus comprising:
an image reading apparatus, which reads an image of an original; and
an image forming apparatus, which forms an image on a sheet on the basis of image reading information of said image reading apparatus,
wherein said image reading apparatus is an image reading apparatus according to claim 7.

11. An image reading and forming apparatus according to claim 10, wherein said image forming apparatus is provided with a recording sheet stacking portion on which a recording sheet on which an image is to be formed is stacked, and said conveying path of said image reading apparatus is disposed above said recording sheet stacking portion, and a space permitting the downstream portion of said outer side wall to be downwardly rotated is provided between said recording sheet stacking portion and said conveying path.

* * * * *

UNITED STATES PATENT AND TRADEMARK OFFICE
CERTIFICATE OF CORRECTION

PATENT NO. : 7,241,985 B2
APPLICATION NO. : 11/358208
DATED : July 10, 2007
INVENTOR(S) : Fumihiko Nakamura et al.

It is certified that error appears in the above-identified patent and that said Letters Patent is hereby corrected as shown below:

COLUMN 2:
Line 62, "another" should read --other--.

COLUMN 3:
Line 40, "form" should read --forming--.

COLUMN 4:
Line 9, "be" should be deleted.
Line 58, "constituted" should read --constituted of--.

COLUMN 5:
Line 28, "into" should read --into and--.
Line 31, "into" should read --into and--.

COLUMN 7:
Line 24, "the" (first occurrence) should be deleted.
Line 64, "a time." should read --this time--.

COLUMN 8:
Line 8, "reflect" should read --reflects--.

Signed and Sealed this

First Day of April, 2008

JON W. DUDAS
*Director of the United States Patent and Trademark Office*